United States Patent

[11] 3,630,140

| | | |
|---|---|---|
| [72] | Inventor | Paul Marrie<br>Dijon, France |
| [21] | Appl. No. | 40,567 |
| [22] | Filed | May 26, 1970 |
| [45] | Patented | Dec. 28, 1971 |
| [73] | Assignee | Societe A Responsabilite Limitee dite:Etude<br>Quetigny, (Cote d'Or), France |
| [32] | Priorities | May 28, 1969 |
| [33] | | France |
| [31] | | 6917401; |
| | | Apr. 24, 1970, France, No. 7015150 |

[54] PANCAKE-BAKING MACHINE
16 Claims, 15 Drawing Figs.

[52] U.S. Cl.......................................... 99/423
[51] Int. Cl............................................ A21b 1/48
[50] Field of Search................................ 99/423,
237, 353, 421, 421 HH, 427, 443; 107/57, 60;
118/216, 221; 18/15 R, 15 S

[56] References Cited
UNITED STATES PATENTS

| | | | |
|---|---|---|---|
| 755,123 | 3/1904 | Flygare........................ | 99/423 |
| 1,152,184 | 8/1915 | Kluge........................... | 99/423 X |
| 1,639,168 | 8/1927 | Dorozynski.................. | 99/423 X |
| 1,718,961 | 7/1929 | Humphrey.................... | 99/421 HH |
| 2,604,848 | 7/1952 | Mullen.......................... | 118/63 X |
| 2,917,988 | 12/1959 | Harris........................... | 99/327 |
| 3,489,106 | 1/1970 | Ostanlen...................... | 107/60 |

*Primary Examiner*—Robert W. Jenkins
*Assistant Examiner*—Arthur O. Henderson
*Attorney*—Karl F. Ross

ABSTRACT: Batter from an upwardly open pan is picked up by a rotating transfer roller and spread over an adjoining heated cylinder rotating codirectionally therewith. The cylinder has a peripheral recess, serving to interrupt the transfer of the batter, and is provided near its nadir with a scraper for detaching the baked pancake from its periphery and depositing it on a conveyor or chute.

PATENTED DEC 28 1971 3,630,140

PAUL MARRIE
INVENTOR

BY Karl F. Ross
Attorney

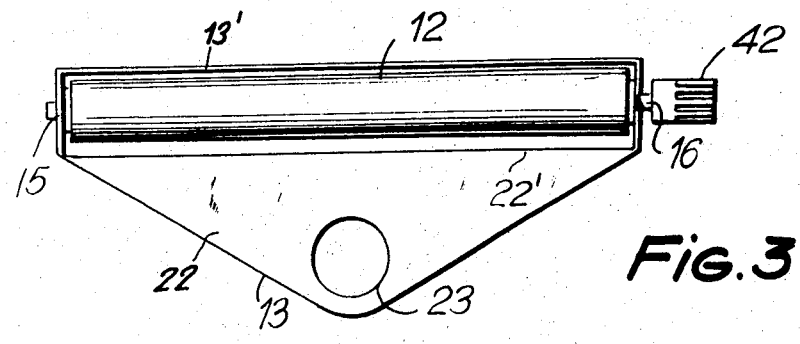
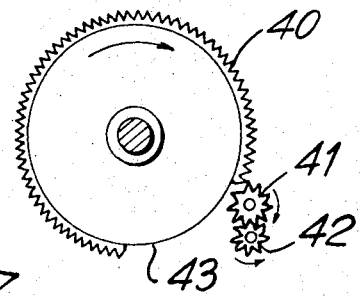
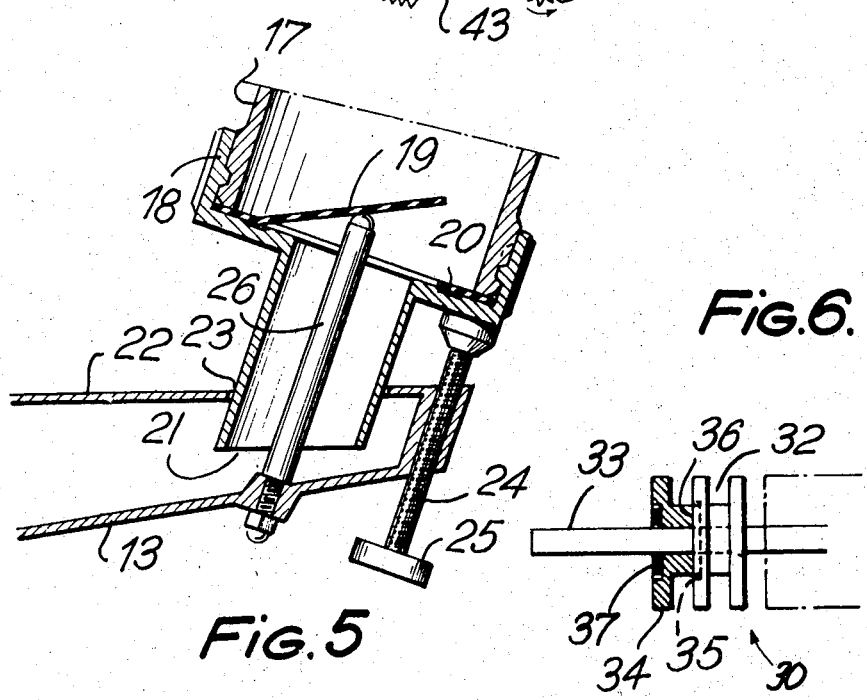

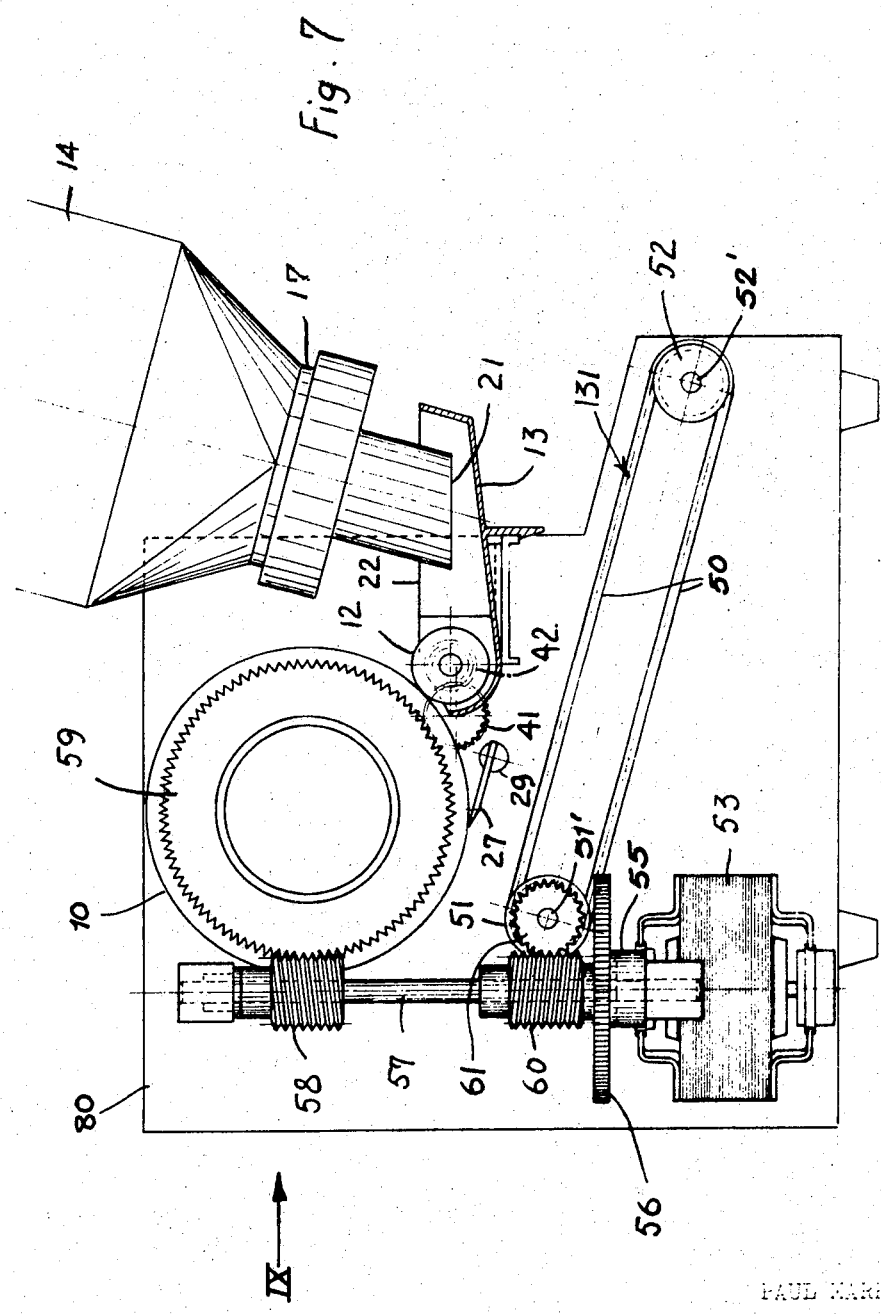

PAUL MARRIE
INVENTOR.

BY Karl G. Ross
Attorney

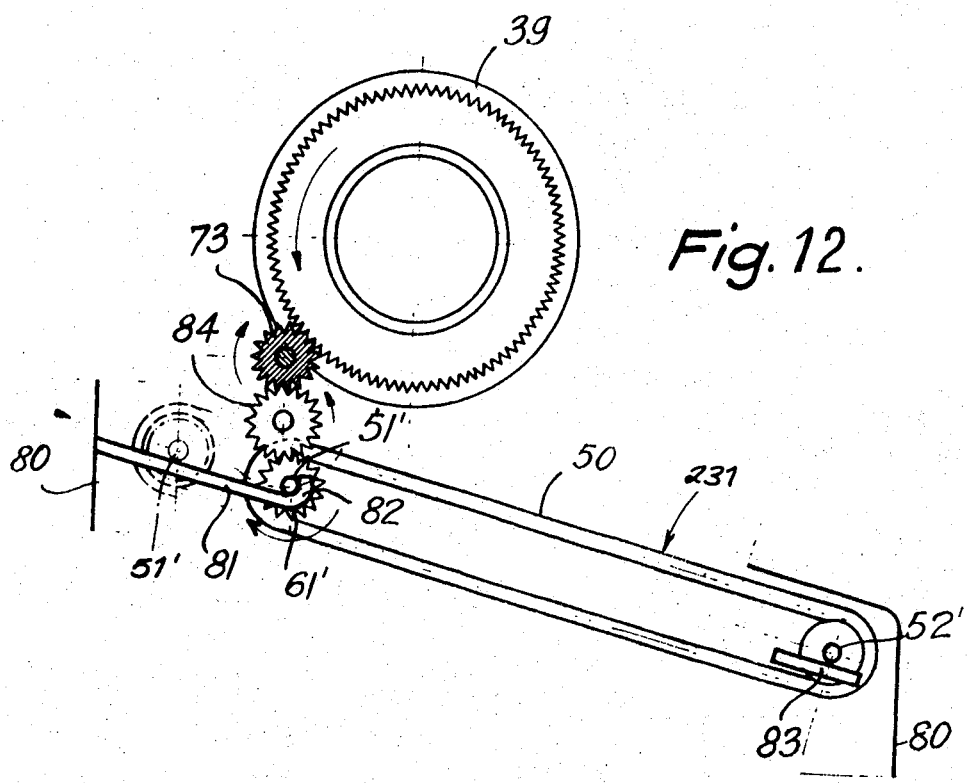
Fig. 12.
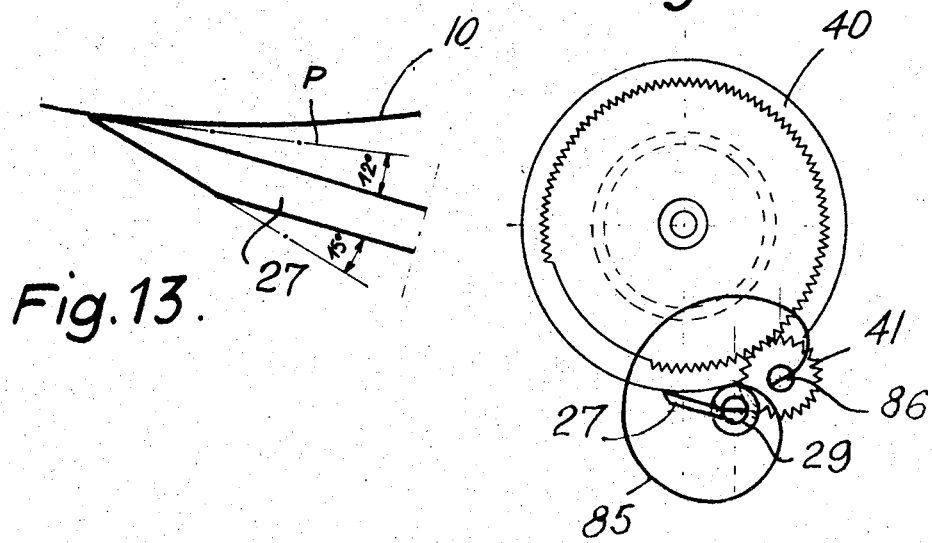
Fig. 13.
Fig. 14.
PAUL MARRIE
INVENTOR
BY Karl F. Ross
Attorney

PANCAKE-BAKING MACHINE

My present invention relates to a machine for making flat baked goods, such as pancakes.

In the serial production of pancakes and the like it is necessary to provide a constantly available but periodically interrupted supply of batter apportioned in accordance with the size of the individual article. In the past, such articles were mass-produced by counterrotating drums or rollers, maintained at the suitable elevated temperature, with surface depressions designed to receive a measured quantity of batter for baking. Another solution involved the intermittent separation of two counterrotating cylindrical bodies to break the continuity of the supply.

The general object of my present invention is to provide an improved machine for the purpose set forth which does not require complicated surface patterns on a baking cylinder or a relative mobility of the axes of two juxtaposed, rotating bodies.

A more specific object is to provide improved means for controlling the supply of batter to a baking cylinder and for removing the baked or partly baked layer of batter from the cylinder surface.

In accordance with the present invention I provide a heatable drum mounted for rotation about a horizontal axis and, closely juxtaposed therewith, a similarly mounted transfer roller having access to a supply of batter for spreading same over the periphery surface of the rotating drum; this peripheral surface is uniformly cylindrical except for an axially extending recess, or possibly several equispaced recesses, generally subtending only a minor fraction (e.g., about a quadrant) of the drum circumference. With the drum and the roller codirectionally driven, and with the peripheral roller speed at least equal to but preferably somewhat higher than the peripheral drum speed, the batter picked up by the roller is transferred to the drum as a continuous layer until the leading edge of the recess confronts the roller. At this point, the normally narrow gap between the drum and the roller suddenly widens so that the batter adhering to the roller surface no longer reaches the drum but is returned to the trough from which it was taken, the transfer roller advantageously dipping directly into this trough in which the level of the batter is held substantially constant in a manner more fully described hereinafter.

For the most effective transfer in the case of a roller partly submerged in the batter supply, this roller should be positioned next to the lower quadrant of the drum on the ascending side thereof. The hot layer of cooked dough adhering to the drum surface is then stripped off, preferably at or near the nadir of the drum, by a scraper which may comprise a blade resiliently biased thereagainst. The layer so removed may drop onto downwardly sloping transport means such as a chute or a conveyor carrying it, if desired, onto another heated surface for the baking of the hitherto exposed side of the pancake.

The time required for baking on the drum varies, of course, with such parameters as the drum temperature and the consistency of the mix. In some instances, therefore, this time may be longer than a drum revolution if the latter were to turn a constant speed sufficient to prevent the freshly entrained batter from running off the surface of the transfer roller. Under these circumstances, pursuant to another feature of my invention, the drum drive is provided with stop means for temporarily arresting the drum in a position in which its recess confronts the transfer roller, i.e., in which a complete layer has been deposited on the cylindrical drum surface. During this curing period the transfer roller may also be arrested, this being brought about in the simplest way by powering that roller from the drum through the intermediary of suitable transmission means such as a gear train. The driving member of this gear train may be coaxially mounted on the drum shaft and may have some teeth omitted so that the transmission of torque to the transfer roller is ineffectual in its position of confrontation of the drum recess whereby the roller remains stationary as the recess sweeps past, i.e., between depositions of successive layers of batter. This prevents the formation of a circulating batter film on the roller and allows the previously entrained mix to flow back into the pool. Upon the approach of the trailing edge of the recess, however, the transfer roller should be already in motion in order to start applying the batter to the cylinder surface immediately beyond the recess.

Another advantageous feature of my invention resides in the provision of a conveyor, as part of the aforementioned transport means, formed by several juxtaposed endless belts led around pulleys on two parallel shafts which are journaled in respective bearing extensions of a rigid insert spanned by the belts. The tray-shaped assembly of shafts, belts and insert can be removably positioned on a pair of inclined supports within the machine housing, with the input-side shaft located at a higher level than the other in the vicinity of the drum scraper; this shaft may be rotated via another gear train from the drum drive, the gears of that train being so disposed as to help retain the assembly in its operating position.

The above and other features of my invention will be described in detail hereinafter with reference to the accompanying drawing in which:

FIG. 3 is a top view of another part;

FIG. 4 is a somewhat diagrammatic representation of a gear train included in the machine;

FIG. 5 is a cross-sectional view of some of the elements of FIG. 1, drawn to a larger scale;

FIG. 6 is a fragmentary detail view, partly in section, of another element of the assembly;

FIG. 7 is a view similar to FIG. 1, showing a modification;

FIG. 12 is a side-elevational view of the unit of FIG. 11;

FIG. 13 is an enlarged, somewhat diagrammatic view of part of a scraper shown in FIG. 1;

FIG. 14 is an end view taken on the line XIV—XIV of FIG. 2; and

FIG. 15 is an overall diagram depicting the operation of a system embodying my invention.

Figure 1:
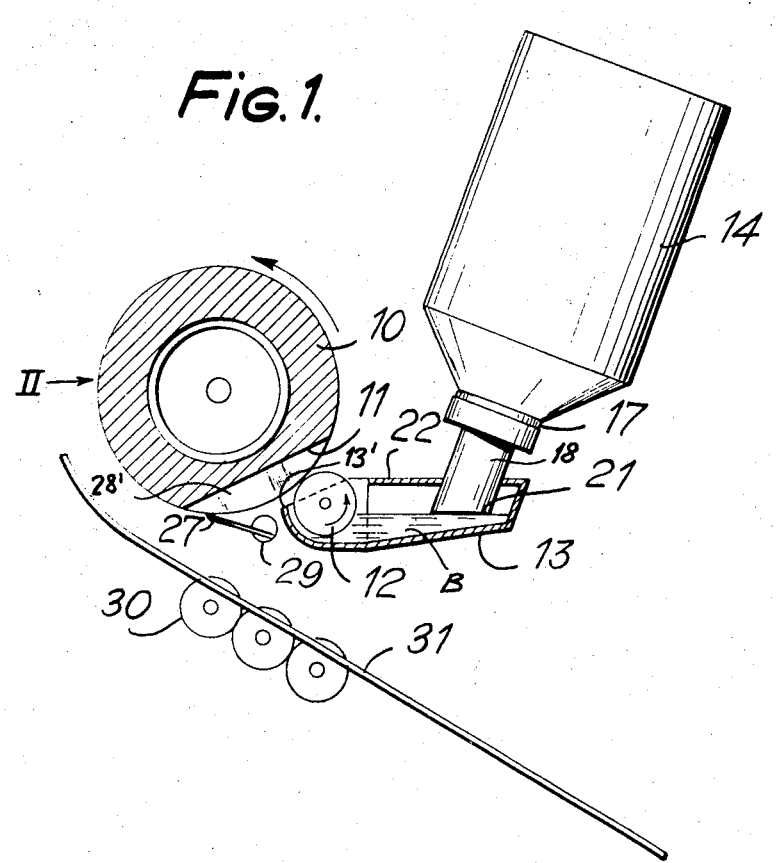
FIG. 1 is a side-elevational view, partly in section, of a pancake-making machine embodying the invention.

I shall first describe, with reference to FIG. 15, the general operation of a pancake-making machine according to my invention.

A drum 10, preferably cast of aluminum and provided with heating means here shown as a set of tubes 90, is rotatably about a horizontal axis 0 under the control of an electric motor 53. Tubes 90 advantageously contain electric resistance elements, energized via slip rings on opposite ends of the drum shaft, but could also be transversed by a hot fluid admitted and removed through that shaft as is well known per se.

A segment of the otherwise cylindrical drum 10 is cut away at 11 to form a peripheral recess extending over a minor fraction of its circumference, e.g., about 90°. Except when confronted by the recess 11, a transfer roller 12 dipping into a pan 13 is separated by only a very narrow clearance from the drum surface so as to spread a layer of batter B onto the drum surface, beginning at recess 11. Drum 10 and roller 12 are driven in the same direction, here counterclockwise, and at peripheral speeds preferably somewhat higher for the roller than for the drum. Thus, in a representative machine designed for household use, the roller 12 may be dimensioned to have a peripheral speed of 370 to 450 cm./min. while rotating at 50 to 70 r.p.m., with the drum 10 turning at 8 to 10 r.p.m. and having a peripheral speed of 220 to 250 cm./min.; the operating temperature of the drum surface may range between 250° and 350°. Pan 13 may have a capacity of 1 to 2 liters. A scraper blade 27, bearing under light pressure on the underside of the drum at an angle of approximately 15°, strips the previously cooked layer off the drum surface and deposits it on a chute 31 (or a positively driven conveyor as described hereinafter) for delivery to another heated surface 91 designed to cook the previously exposed side of the pancake. Surface 91 may form part of an endless steel band or the like supported by two driven rollers 92, 93; a stripper 94 removes the fully cooked layer from the heated band 91 which may pass, at a speed suitably correlated with that of drum 10, over one or more burners not shown.

In order to increase the time available for baking the film of dough adhering to drum 10, the latter may be arrested for a predetermined period while its recess 11 confronts the roller 12 (as illustrated in FIG. 1). For this purpose there is depicted in FIG. 15 an energizing circuit for motor 53 including, in series with a master switch 95, a current source 96 shown diagrammatically as a battery, a cam 97 in step with drum 10, and a slow-operating relay 98 representative of any conventional timer. A mobile armature 99, biased against the surface of cam 97, normally closes the motor circuit through switch 95 but opens that circuit in the position of FIG. 1, at the same time closing a circuit for the operation of relay 98 which after a certain time (e.g., of 1 to 40 seconds) attracts its armature to close an alternate energizing circuit for the motor. Naturally, such an interruption of the drum drive will not be needed if the drum speed is sufficiently low, as pointed out above.

Although a DC circuit has been shown for the sake of simplicity, motor 53 could also be of the AC (e.g., single-phase or three-phase induction) type.

Cam 97 may further control a switch, not shown, for operating a blower to direct a flow of cooling air into the gap between recess 11 and roller 12.

FIGS. 1-6 show details of a first embodiment in which, for the sake of simplicity, the heating elements 90 for roller 10 have been omitted. Pan 13 is of generally triangular horizontal outline, as best seen in FIG. 3, and is partly overlain by a cover 22 having a feed opening 23. One edge 13' of the pan, at the longest side of the triangle, is spaced from an edge 22' of cover 22 to form an upwardly open trough accommodating the transfer roller 12, the pan bottom curving about the roller 12 in the vicinity of edge 13' so as to envelop it up to the level of its median plane.

An inverted supply container 14 has a neck 17 connected by a bayonet coupling with an outlet 18 overlain by an elastic valve plate 19, e.g., of nontoxic rubber; a post 26, rising from the bottom of pan 13, traverses the outlet 18 to open the valve 19 when the outlet is inserted into the pan through the hole 23. It will be noted that the container axis is inclined away from the drum 10, the resulting increased separation guarding against a premature cooking of the contents of the vessel by heat radiated from the drum surface. Outlet 18, which by virtue of the bayonet connection occupies a predetermined position relative to vessel 14, is correspondingly beveled at 21 so as to have a horizontal face substantially on the level of the roller axis. The precise elevation of face 21 above the pan bottom may be adjusted with the aid of a screw 24 with a milled head 25 threaded into the end wall of the pan 13 and forming a support for the outlet 18; by this means it is possible to adjust the quantity of batter B in the pan to just the amount necessary for coating the cylindrical drum surface from one edge of recess 11 to the other. A gasket 20 is shown interposed between a shoulder of outlet 18 and the resilient valve member 19.

Because of the viscosity of the batter, and the closure of the top of the inverted vessel against the atmosphere, the pool in pan 13 will not rise appreciably above the level of face 21 so that the quantity of batter in the pan can be accurately dosed with the help of screw 24.

Instead of a refillable container 14, as shown, it is of course also possible to use disposable vessels (e.g., of glass or polyethylene) in which the mix may be initially stored ready for use or dehydrated as a powder; in the latter case the container should carry markings to indicate the quantity of water or milk to be added prior to utilization. Upon removal of the original seal from such a container, the outlet 18 may be fitted thereon. If variable dosing is not required, the screw 24 may be omitted and the container or the outlet may come to rest on a fixed stop; thus, e.g., the container mouth (not beveled but perpendicular to the axis in this instance) may bear directly upon the sloping pan bottom to discharge the batter towards the roller 12.

Figure 2:
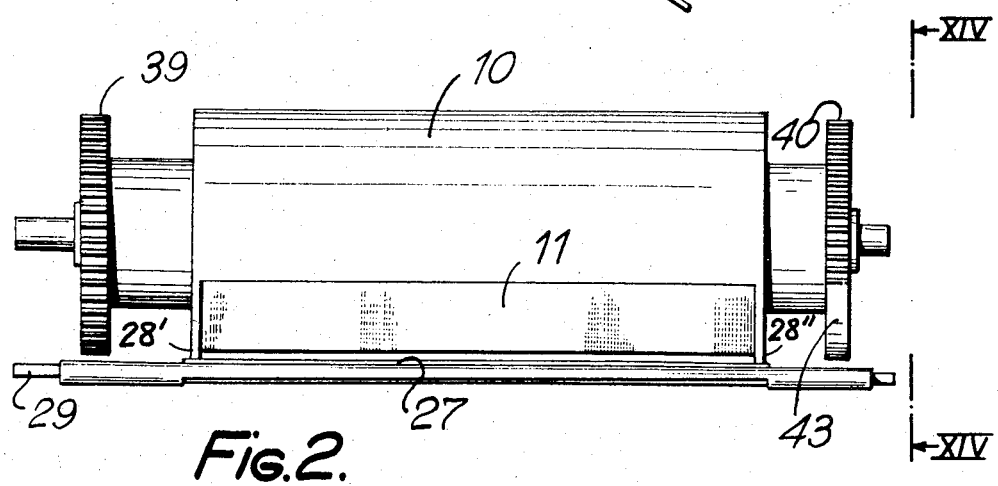
FIG. 2 is an end view of part of the assembly of FIG. 1 as seen in the direction of arrow II thereof.

As shown in FIGS. 1 and 2, scraper 27 is a blade slightly longer than the drum 10 so as to ride on the segmental bosses 28', 28" of that drum, flanking the recess 11, when this recess is in the bottom position. Blade 27 is secured to a bar 29 journaled in a fixed part of the machine housing 80 (FIGS. 7 and 8), an end of this bar being enveloped by a spiral spring 85, FIG. 14, having its outer end anchored by a screw 86 to a fixed support, here specifically a rod carrying a freely rotatable pinion 41. Spring 85 biases the blade 27 against the surface of drum 10 at a small rake angle, e.g., of 12°, with reference to a plane P tangent to the drum periphery at the zone of contact; the latter zone should be of very limited width, e.g., of 0.1 to 0.3 mm., to minimize the friction therebetween. The vertex angle of the blade is of the same order of magnitude as the rake angle, here 15°.

As further shown in FIG. 2, the shaft of roller 10 carries two spur gears 39 and 40 rotating in unison therewith. Gear 40, as illustrated in FIG. 4, meshes with pinion 41 which in turn drives a pinion 42 on the shaft of roller 12 (see also FIGS. 7 and 8). At 43 a number of teeth of gear 40 are omitted whereby roller 12 remains stationary for a fraction of a turn timed to coincide substantially with the confrontation of the roller with recess 11; the first tooth of gear 40, however, engages the pinion 41 slightly before the trailing edge of recess 11 reaches the roller 12 so that this roller rotates through an arc of at least 90° to pick up fresh batter before that edge passes it.

As further shown in FIG. 1, the chute 31 may be supplemented by a set of driven or nondriven rollers 30 projecting upwardly through parallel slots in the chute, the first of these transport rollers being disposed just below the scraping edge of blade 27. FIG. 6 shows details of the construction of such a roller which is seen to comprise a set of coaxial disks 34 mounted on a common shaft 33, these disks having hubs 35 received in depressions 36 of adjoining disk faces so as to form gaps 32 between their peripheries; a cotter pin 37 retains the first disk in position whereas the opposite end of the stack may be similarly held in place by a removable detent such as a circle, not shown. The disks 34 advantageously consist of the same type of nontoxic rubber as the valve member 19 described above.

Figure 10:
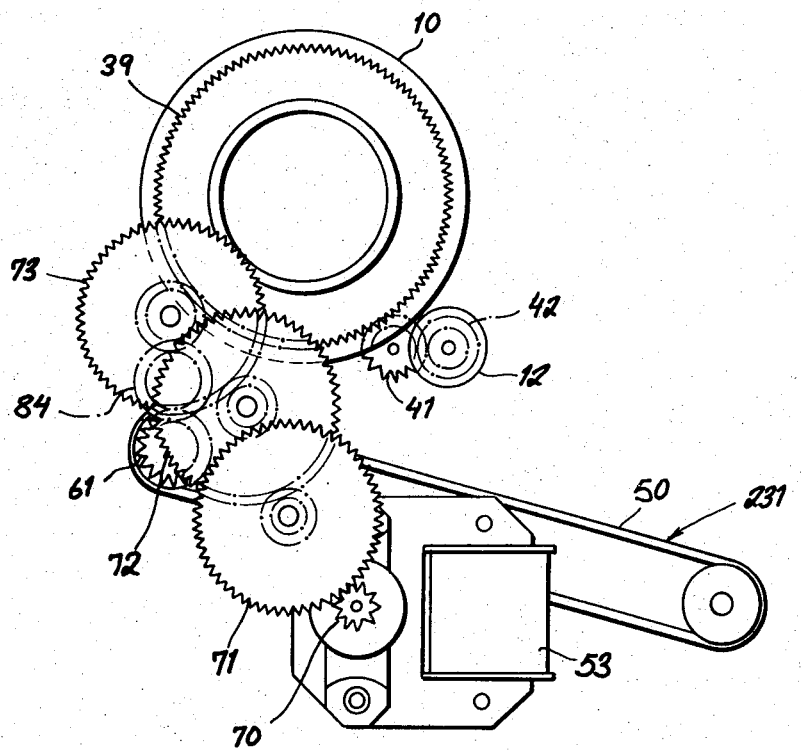
FIG. 10 is a diagrammatic view, similar of FIG. 4, of another gear train included in the assembly of FIG. 1.

The spur gear 39 shown in FIG. 2 forms part of a speed-reducing transmission which, as illustrated in FIGS. 10 and 12, includes three stepped gears 71, 72 and 73 as well as a pinion 70 driven by motor 53.

Figure 8:
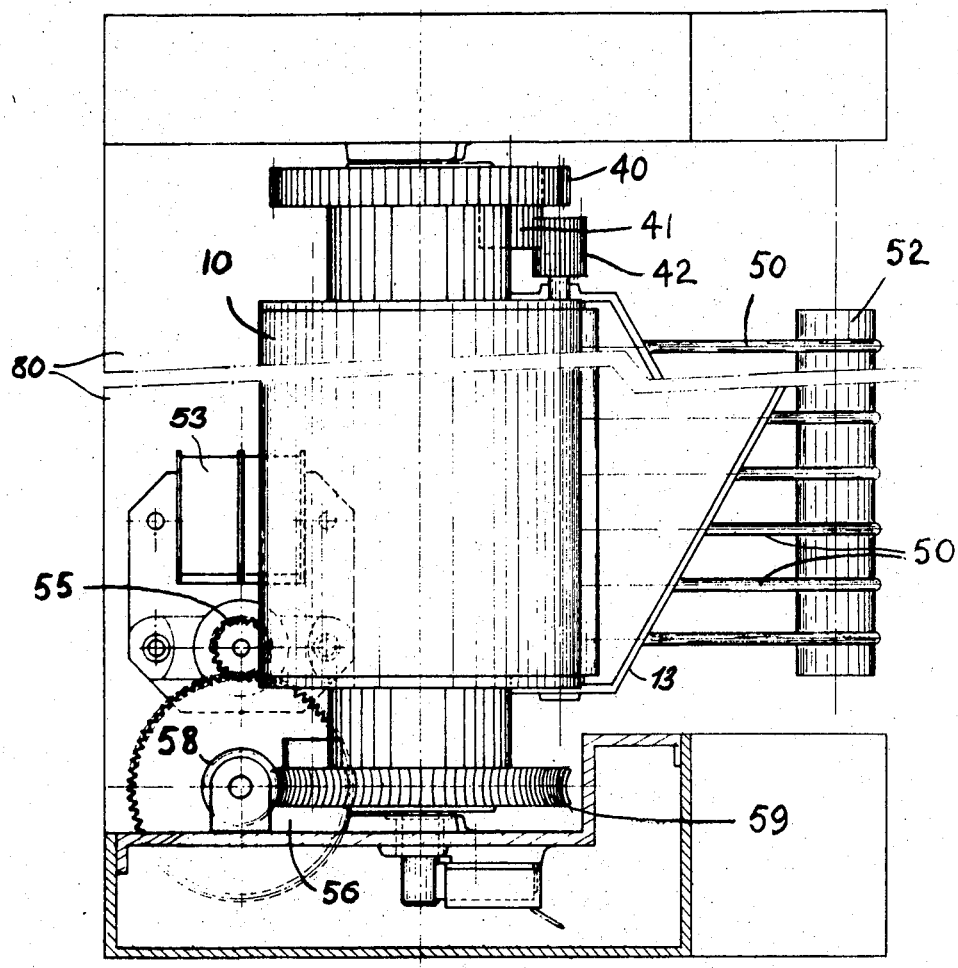
FIG. 8 is a partial top view of the assembly shown in FIG. 7.
Figure 9:
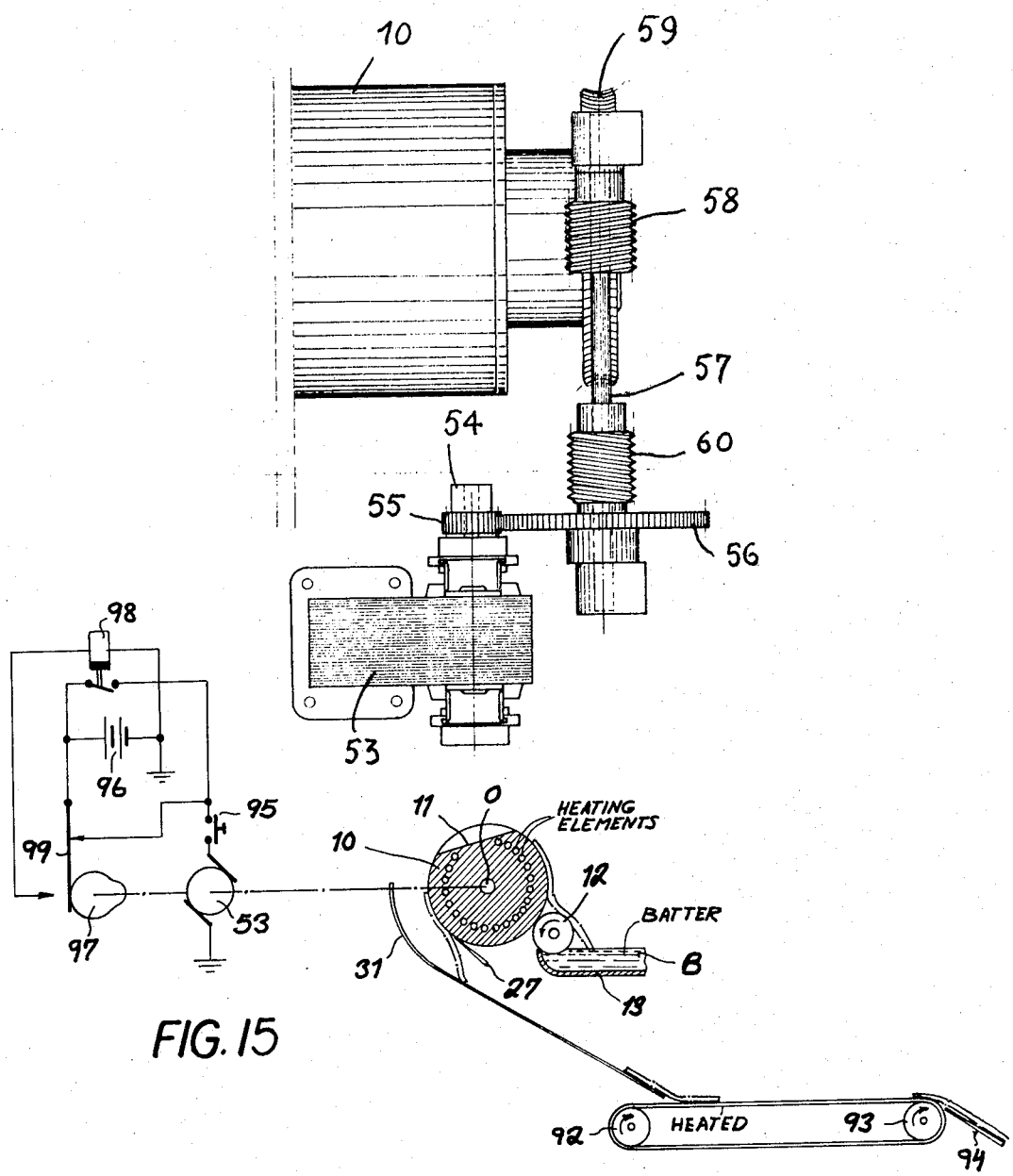
FIG. 9 is a fragmentary end view of that assembly as seen in the direction of arrow IX in FIG. 7.

FIGS. 7-9 illustrate a modification in which the drum drive comprises a helicoidal worm gear 59, in mesh with a worm 58 on an upright shaft 57, in lieu of the spur gear 39. Shaft 57, driven from motor 53 via a pinion 55 and a gear 56, also carries another worm 60 driving a worm gear 61 on a shaft 61' of a conveyor 131 replacing the chute 31 of FIG. 1. Conveyor 131 comprises a set of endless V-belts 50 of nontoxic rubber or the like wound around two grooved cylinders 51, 52 on shafts 51' and 52', respectively.

Figure 11:
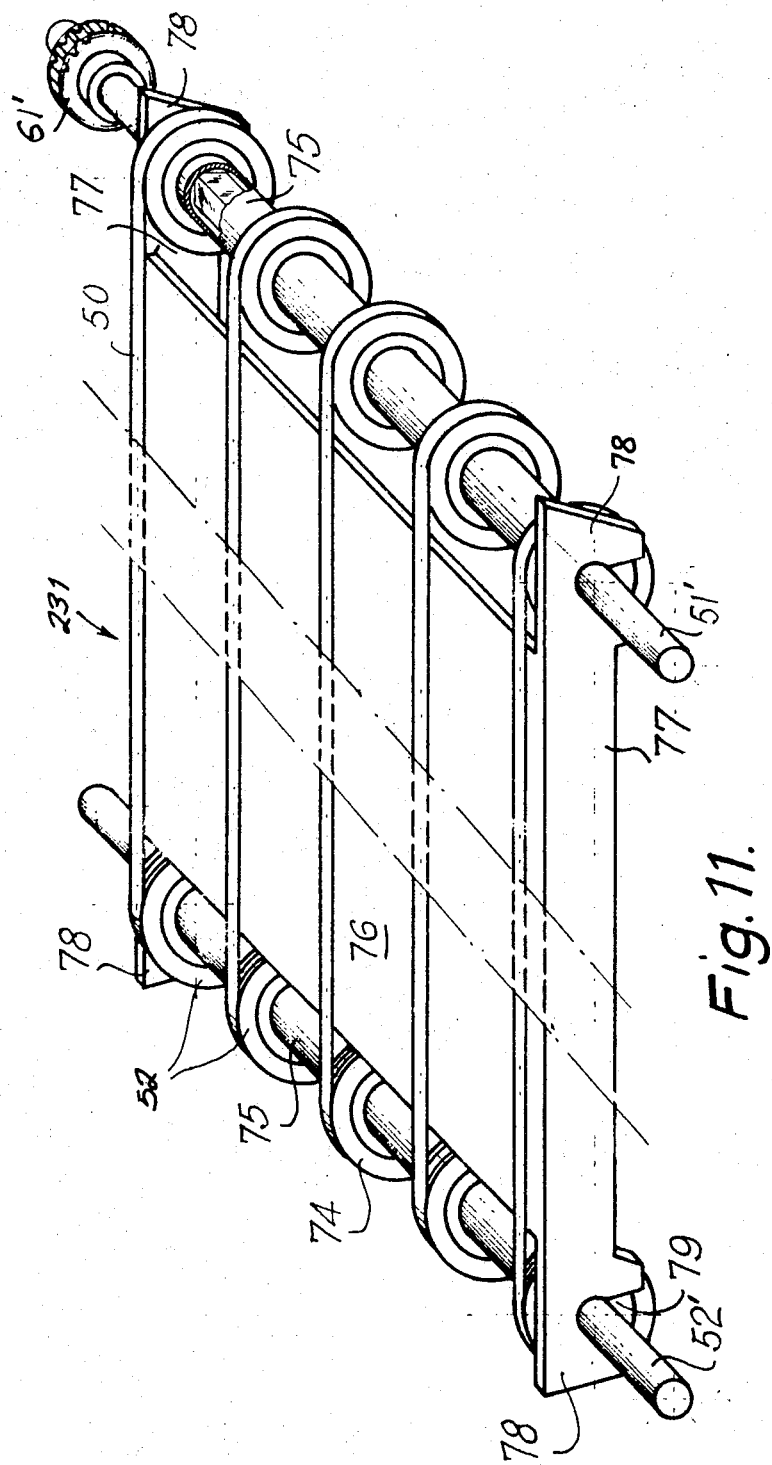
FIG. 11 is a perspective view of a conveyor unit adapted to be used in a machine according to the invention.

FIGS. 10-12 show a modified conveyor 231 wherein the belts 50 are wound around pulleys 74 separated by sleeves 75 on shafts 51' and 52'. Shaft 51' carries a spur gear 61' which is driven from stepped gear 73 through the intermediary of another reversing pinion 84. The two shafts 51', 52' are held separated by a rigid insert 76 in the form of a flat plate with cheeks 77 terminating in lugs 78 which form reentrant cutouts for the ends of these shafts. Inserts 76-78 may be molded in one piece from a somewhat elastic resinous material enabling the shafts to be snapped into position within these downwardly flared cutouts. The entire unit 231 so formed may then be bodily inserted into the machine housing 80 or withdrawn from it for cleaning or repair. Thus, as illustrated in FIG. 12, housing 80 may be provided with two pairs of inclined shelves 81 and 83 serving to support the ends of these shafts, shelves 81 terminating in hooks 82 to retain the upper shaft 51' against the force of gravity. Upon installation of the gear train illustrated in FIG. 12, the unit is also locked against upward sliding (to the left in FIGS. 10 and 12) since the shafts of gears 61' and 84 lie in the plane including an acute angle with shelves 81 whereby the gear 61' can be forced past the gear 84 only with a certain elastic deformation of these shelves.

It is to be understood that elements of different embodiments may be interchanged to the extent of their compatibility with the remaining structure.

I claim:

1. A machine for making pancakes and the like, comprising:
   a trough adapted to receive a continuous supply of batter;
   a drum mounted adjacent said trough for rotation about a horizontal axis, said drum being provided with a continuous cylindrical peripheral surface except for an axially extending recess;
   a transfer roller with access to the batter in said trough closely juxtaposed with said drum and mounted for rotation about another horizontal axis;
   drive means for codirectionally rotating said drum and said roller with a peripheral roller speed not less than the peripheral drum speed whereby batter picked up by said roller is spread over said continuous peripheral surface;
   heating means for maintaining said drum at a temperature sufficient to bake the adhering layer of batter; and
   scraper means downstream from said roller in the direction of drum rotation for removing the baked layer from said drum.

2. A machine as defined in claim 1 wherein said roller and said drum are provided with transmission means for imparting rotation to said roller upon rotation of said drum by said drive means, said transmission means being ineffectual during part of a drum revolution substantially coinciding with confrontation of said roller by said recess.

3. A machine as defined in claim 2 wherein said transmission means includes a driving gear coaxial with said drum having an interrupted set of teeth.

4. A machine as defined in claim 1, further comprising stop means for temporarily arresting said drive means in a position of confrontation of said roller by said recess.

5. A machine as defined in claim 1 wherein said roller is disposed adjacent the lower quadrant of said drum on the ascending side thereof.

6. A machine as defined in claim 5 wherein said trough has an edge proximal to said drum partly enveloping the lower half of said roller and is provided with an overlying cover leaving a clearance for the upper half of said roller, said lid having an opening for the supply of batter.

7. A machine as defined in claim 6, further comprising a supply vessel having an outlet inserted from above through said opening, said outlet terminating at a level above the bottom of said trough substantially coinciding with the axial plane of said roller.

8. A machine as defined in claim 7 wherein said vessel is provided with valve means for closing said outlet, said trough being formed with an upstanding element passing through said outlet for opening said valve means upon insertion of said neck into said opening.

9. A machine as defined in claim 7 wherein said trough is provided with bracing means for said vessel adjustable to vary the elevation of said outlet above said bottom.

10. A machine as defined in claim 7 wherein said vessel has a centerline inclined to the vertical in a direction away from said drum, said outlet having a substantially horizontally beveled end.

11. A machine as defined in claim 1 wherein said scraper means comprises a stripper blade resiliently urged onto the underside of said drum.

12. A machine as defined in claim 11 wherein said blade is provided with spiral spring means for biasing same upwardly against said underside.

13. A machine as defined in claim 11 wherein said blade has an edge inclined at a small rake angle to a plane tangent to said drum, said edge having a vertex angle on the order of magnitude of said rake angle.

14. A machine as defined in claim 1, further comprising transport means underneath said drum for carrying off a baked layer removed therefrom by said scraper means.

15. A machine as defined in claim 14, further comprising supplemental heating means with a receiving surface adjacent a delivery end of said transport means for baking the previously exposed side of said layer.

16. A machine as defined in claim 14 wherein said transport means comprises a chute having a set of parallel slots and an array of transport rollers projecting upwardly through said slots.

* * * * *